United States Patent
Fume

(10) Patent No.: US 11,900,060 B2
(45) Date of Patent: Feb. 13, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventor: Kosei Fume, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 329 days.

(21) Appl. No.: 17/184,690

(22) Filed: Feb. 25, 2021

(65) Prior Publication Data

US 2021/0312130 A1  Oct. 7, 2021

(30) Foreign Application Priority Data

Apr. 6, 2020  (JP) .................................. 2020-068355

(51) Int. Cl.
*G06F 40/289* (2020.01)
*G06F 40/205* (2020.01)

(52) U.S. Cl.
CPC .......... *G06F 40/289* (2020.01); *G06F 40/205* (2020.01)

(58) Field of Classification Search
CPC .............................. G06F 40/289; G06F 40/205
USPC ............................................................. 704/9
See application file for complete search history.

(56) References Cited

U.S. PATENT DOCUMENTS

| | | | | |
|---|---|---|---|---|
| 10,114,885 B1* | 10/2018 | Cheng | ................. | G06Q 30/0282 |
| 10,114,887 B1* | 10/2018 | Cheng | ................... | G06F 16/287 |
| 10,248,712 B1* | 4/2019 | Cheng | ................... | G06F 16/285 |
| 10,740,378 B2* | 8/2020 | Fume | .................... | G06F 16/322 |
| 2013/0324076 A1* | 12/2013 | Harrang | ............ | H04W 28/0812 |
| | | | | 455/405 |
| 2019/0102453 A1* | 4/2019 | Fume | .................... | G06F 16/353 |
| 2021/0312130 A1* | 10/2021 | Fume | .................... | G06F 40/205 |

FOREIGN PATENT DOCUMENTS

| | | |
|---|---|---|
| JP | 2019-53763 A | 4/2019 |
| JP | 2019-53764 A | 4/2019 |
| JP | 2019-67191 A | 4/2019 |
| JP | 2019-164409 A | 9/2019 |

* cited by examiner

*Primary Examiner* — Edwin S Leland, III
(74) *Attorney, Agent, or Firm* — Oblon, McClelland, Maier & Neustadt, L.L.P.

(57) ABSTRACT

According an embodiment, an information processing device includes a memory and one or more processors coupled to the memory. The one or more processors are configured to: cluster key phrases extracted from a document group to generate clusters each including items; extract a sub-document group corresponding to a specified key phrase from the document group; calculate a score for each of the clusters, the score indicating usefulness of information displayed in a graph image that indicates an amount of information for each of the items in the sub-document group; select clusters to be displayed whose scores are from a highest ranking to a predetermined ranking, among the clusters; and generate the graph image of each of the clusters to be displayed.

17 Claims, 14 Drawing Sheets

FIG.5

OBSTACLE
[('PEDESTRIAN', 0.7140356302261353) , ('CAR', 0.6480270028114319) , ('SURROUNDINGS', 0.6357400417327881) , ('BLINDSPOT', 0.6194661855697632) , ('ROAD', 0.5987137556607605) , ('DURING MOVEMENT', 0.5555520832536047) , ('VEHICLE', 0.5539583563804626) ; ('PARKING', 0.5459776520729065) , ('DRIVER', 0.5359983444213867) , ('VISIBILITY', 0.5279737114906311)]

OVERTURNING
[('INJURY', 0.5822230985164 6423) , ('FALLING', 0.5392467379570007) , ('DANGER', 0.5378883481025696) , ('ACCIDENT', 0.5294343829154968) , ('RISK', 0.5257633924484253) , ('FOOT', 0.5254023671150208) , ('EARTHQUAKE', 0.5232973098754883) , ('WALKING', 0.5218368172645569) , ('GROUND', 0.5113734602928162) , ('PROP', 0.4945556223392 4866)]

FIG.6

| | | |
|---|---|---|
| DEFICIENCY | PLACE | 0.08550 |
| ON ROAD | FAILURE | 0.052478 |
| PILOT | STORAGE BATTERY | 0.038855 |
| MIXING | FOREIGN MATTER | 0.029947 |
| ACCELERATION | VIBRATION | 0.027553 |
| PEDESTAL | THIN | 0.027397 |

FIG.7

| CLUSTER NUMBER, | (REPRESENTATIVE WORD, LANGUAGE PROPERTIES), | [ITEM] |
|---|---|---|
| CLUSTER #1, | (TRANSPORTATION, OBJECT), | ['TRANSPORTATION', 'MATERIAL', 'CARGO BED', 'TRUCK', 'HUMAN POWER'] |
| CLUSTER #2, | (LENGTH, OBJECT), | ['LONG', 'GAP', 'HIGH', 'LEAD', 'BUS', 'WITHIN', 'PASS', 'LARGE', 'HEAD', 'MARGIN'] |
| CLUSTER #3, | (BURNING, ACTION), | ['BURNING', 'SLUDGE'] |
| CLUSTER #4, | (UP AND DOWN, OBJECT), | ['UP AND DOWN', 'DOWN', 'UPPER PART', 'LOWER PART', 'HORIZONTAL', 'FRONT AND BACK', 'LEFT AND RIGHT'] |
| CLUSTER #5, | (BAG, OBJECT), | ['BAG', 'BODY', 'FALL', 'EQUIPMENT', 'CARRY', 'TOOL', 'IN HAND', 'USUALLY', 'HANDLING'] |
| CLUSTER #6, | (INJURY, ACTION), | ['INJURY', 'ACCIDENTAL', 'CRASH', 'IF BY ANY CHANCE', 'ELECTRIC SHOCK', 'BARENESS', 'UNEXPECTED', 'INJURED'] |
| CLUSTER #7, | (POSTURE, ACTION), | ['POSTURE', 'DISTANCE', 'INTERSECTION', 'VERTICAL', 'ANGLE', 'CENTER', 'ANGLE'] |
| CLUSTER #8, | (DIALOGUE, ACTION), | ['DIALOGUE', 'UTTERANCE'] |
| CLUSTER #9, | (CLEAN, OBJECT), | ['CLEAN', 'BARE HANDS'] |
| CLUSTER #10, | (VOLTAGE, OBJECT), | ['VOLTAGE', 'DC', 'AC', 'VOLTAGE TRANSFORMATION', 'BOOSTING'] |
| CLUSTER #11, | (DEHYDRATION, OBJECT), | ['DEHYDRATION', 'SLUDGE'] |
| CLUSTER #12, | (BAG, OBJECT), | ['BAG', 'BOX', 'CARDBOARD'] |
| CLUSTER #13, | (ASSEMBLING, ACTION), | ['ASSEMBLY', 'SHEET METAL WORKING', 'ASSEMBLING'] |
| CLUSTER #14, | (MONITOR, OBJECT), | ['MONITOR', 'CAMERA', 'POINT OF VIEW', 'MONITOR', 'PHOTOGRAPHING'] |
| ... | | |

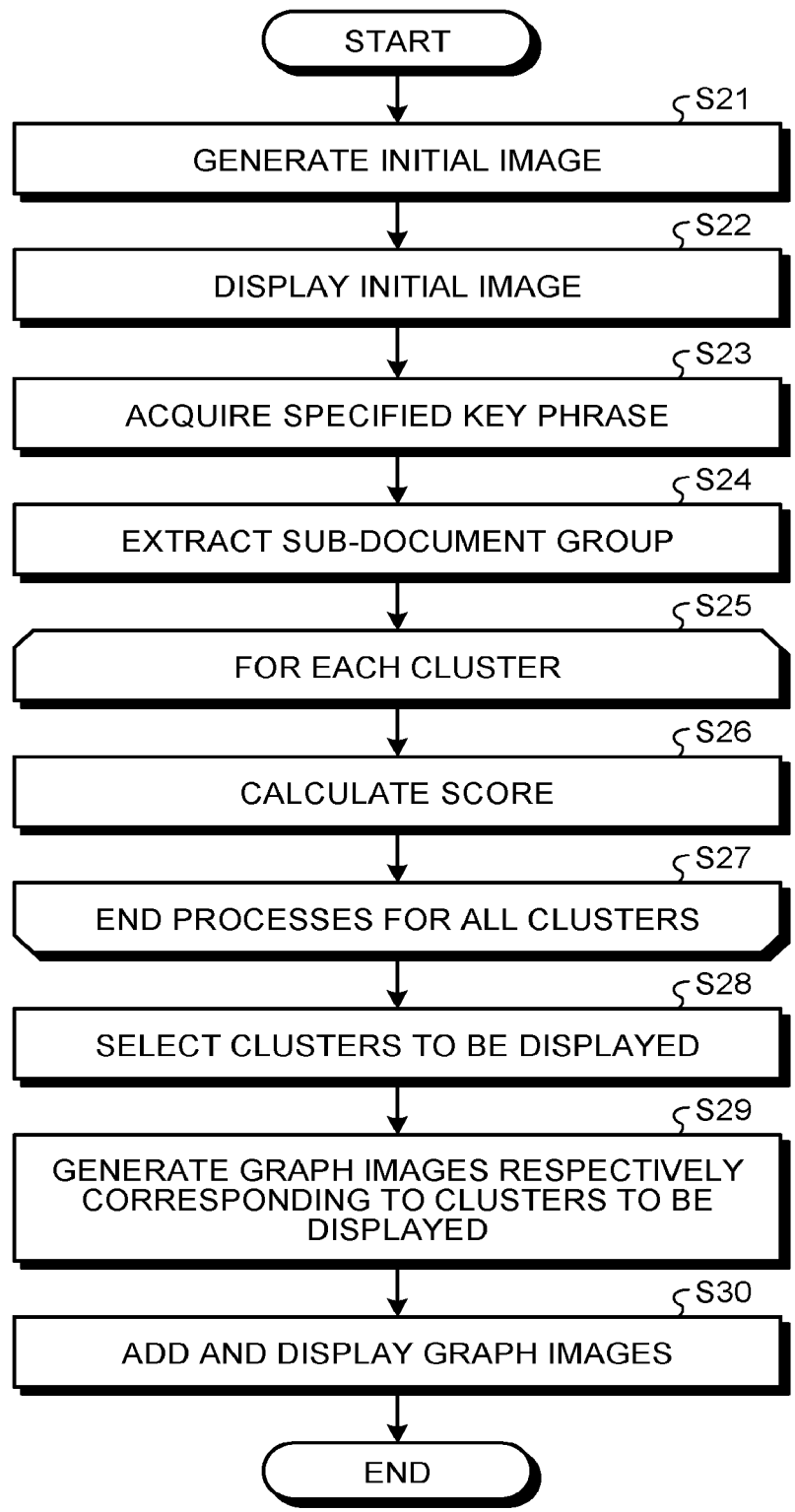

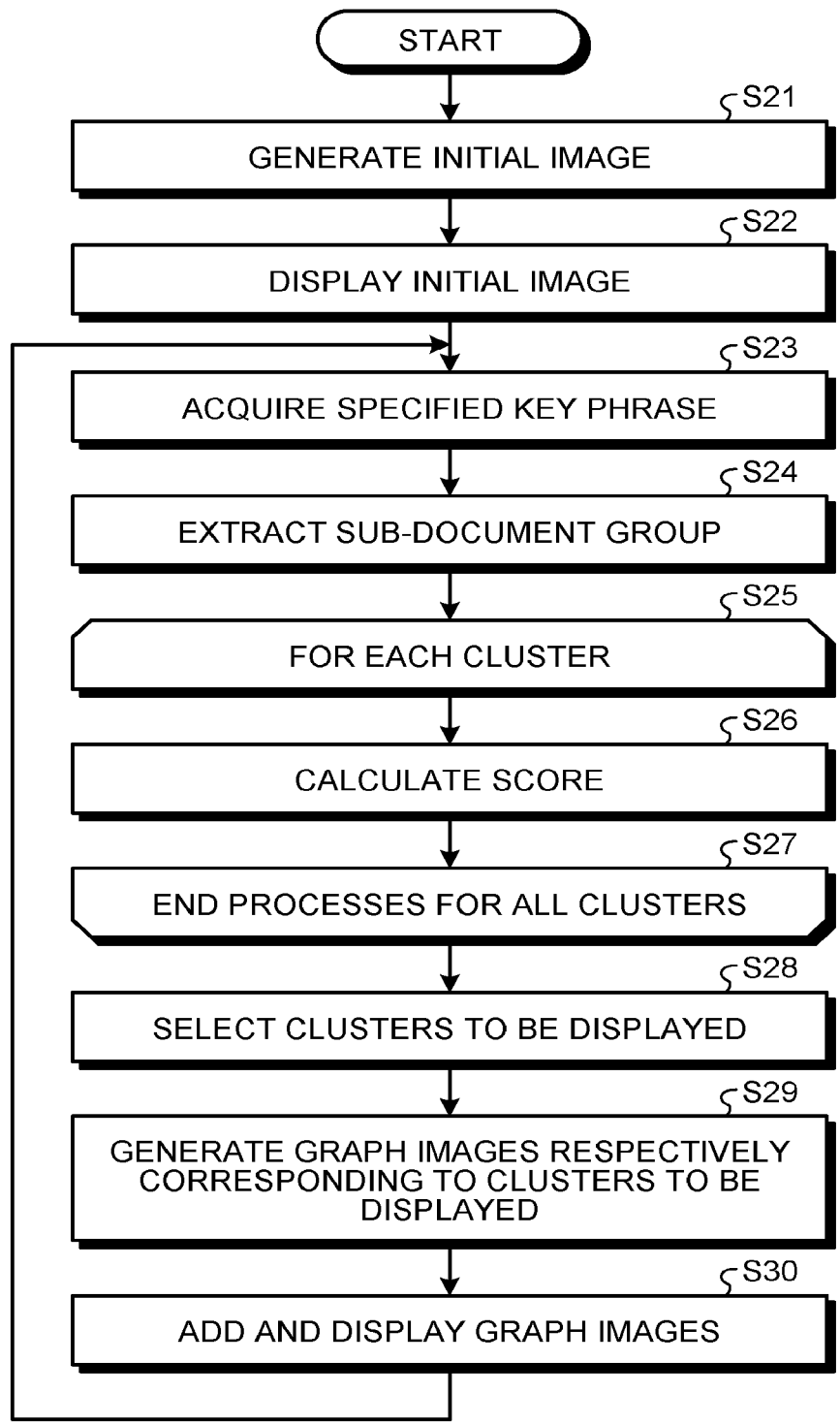

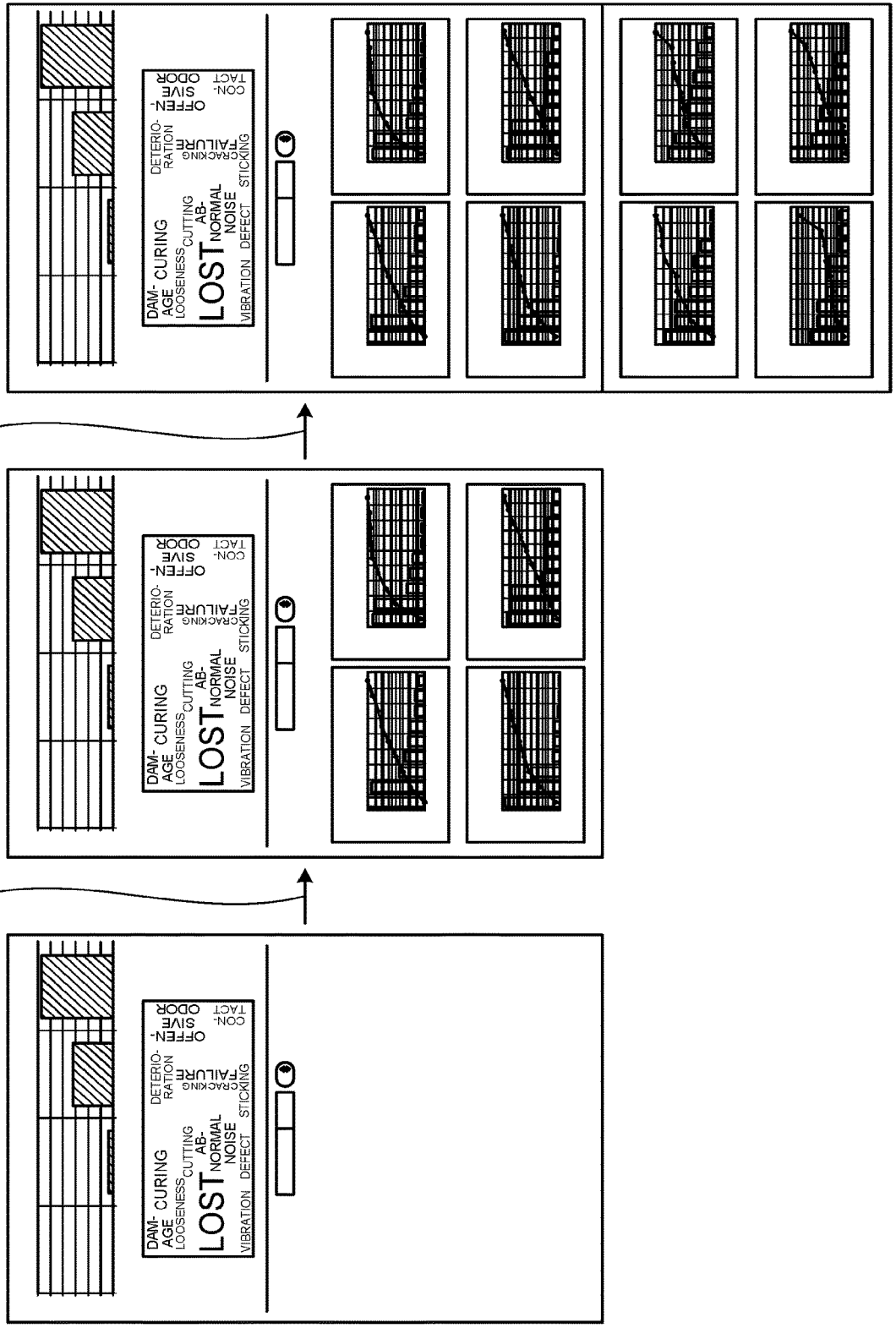

ID, AND COMPUTER PROGRAM PRODUCT

CROSS-REFERENCE TO RELATED APPLICATIONS

This application is based upon and claims the benefit of priority from Japanese Patent Application No. 2020-068355, filed on Apr. 6, 2020; the entire contents of which are incorporated herein by reference.

FIELD

Embodiments described herein relate generally to an information processing device, an information processing method, and a computer program product.

BACKGROUND

There is known a business intelligence (BI) tool that records documents used in business assignments in a database and aggregates or analyzes the recorded documents. The BI tool can simultaneously display a plurality of analysis results, which have been analyzed by a predefined method, in a dashboard manner. Furthermore, the BI tool can display the overall features of a document group in a bird's eye view, or can display the features of the document group while drilling down to the information indicating details from among the information indicating the overall features. Furthermore, the BI tool also allows a user to freely classify the document group by using query languages and interfaces and to display an analysis result for each classification unit.

In general, the BI tool handles documents with a predetermined form. Therefore, it is difficult for the BI tool to analyze, for example, a document group including freely described documents. Furthermore, in general, since the BI tool displays the analysis results analyzed by the predefined method, even though the analysis results are simultaneously displayed in a dashboard manner, analysis results meaningless to a user may also be displayed.

Furthermore, in general, since the BI tool displays analysis results analyzed from a fixed viewpoint, it is difficult to give a new awareness to a user or to make a user to grasp an unknown tendency. Furthermore, in general, with the BI tool, when defining a method for analysis, a user needs to operate query languages and interfaces and thus requires specialized knowledge.

BRIEF DESCRIPTION OF THE DRAWINGS

FIG. 5 is a diagram illustrating an example of similar phrases;

FIG. 6 is a diagram illustrating an example of a co-occurrence phrase;

FIG. 7 is a diagram illustrating an example of a cluster list;

FIG. 8 is a flowchart illustrating the flow of an analysis process of the information processing device according to the first embodiment;

FIG. 9 is a flowchart illustrating the flow of an analysis process of an information processing device according to a second embodiment;

FIG. 10 is a diagram illustrating the transition of an image displayed by the information processing device according to the second embodiment;

DETAILED DESCRIPTION

Figure 1:
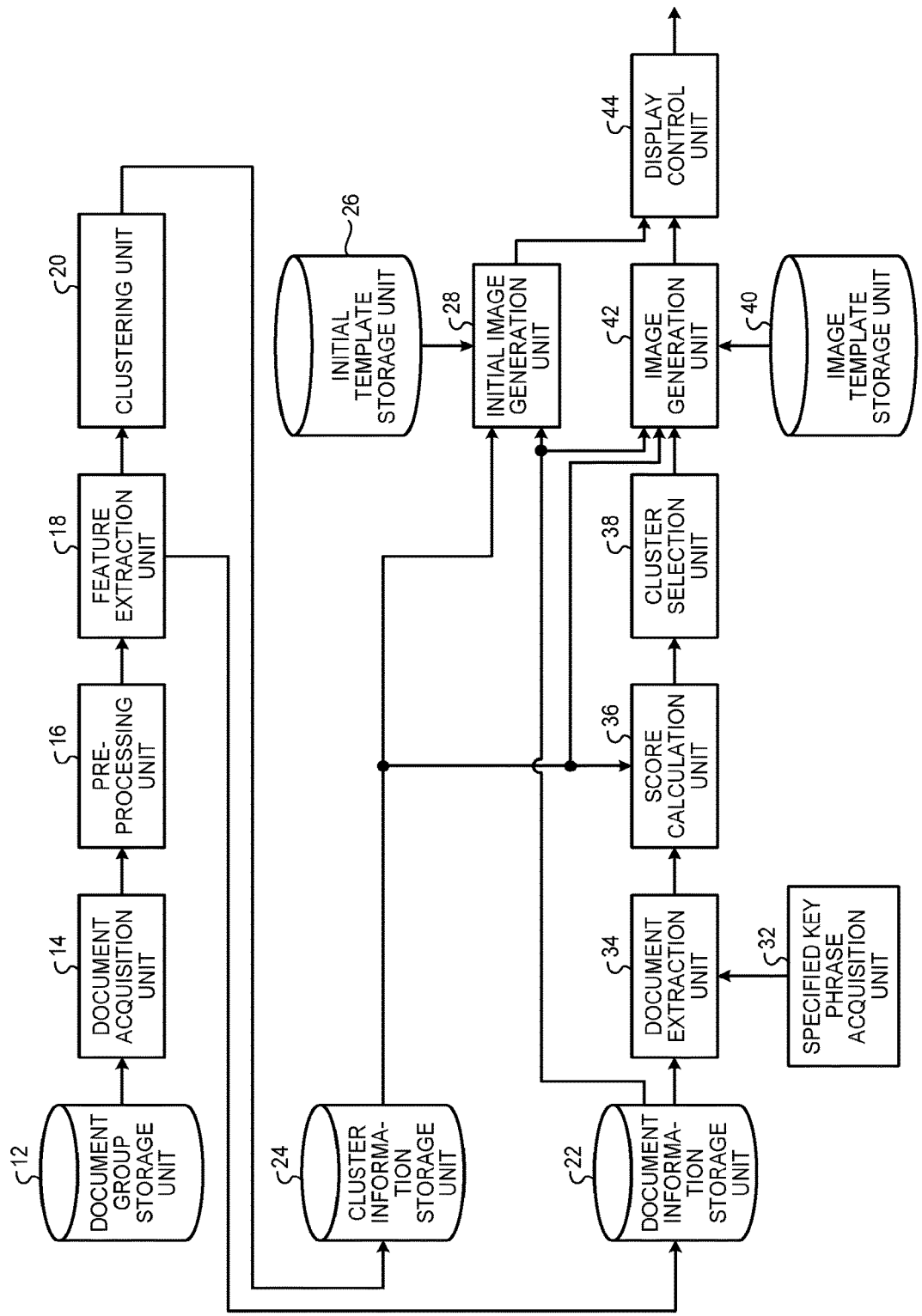
FIG. 1 is a diagram illustrating a configuration of an information processing device according to a first embodiment.

According to an embodiment, an information processing device includes a memory and one or more processors coupled to the memory. The one or more processors are configured to: cluster a plurality of key phrases extracted from a document group to generate a plurality of clusters each including a plurality of items; extract a sub-document group corresponding to a specified key phrase from the document group; calculate a score for each of the plurality of clusters, the score indicating usefulness of information displayed in a graph image that indicates an amount of information for each of the plurality of items in the sub-document group; select a plurality of clusters to be displayed whose scores are from a highest ranking to a predetermined ranking, among the plurality of clusters; and generate the graph image of each of the plurality of clusters to be displayed.

Hereinafter, an information processing device 10 according to embodiments will be described with reference to the accompanying drawings. In each embodiment, components with the same reference numerals have substantially the same configuration and perform substantially the same operations. For the components that have substantially the same configuration and perform substantially the same operations, overlapping description will be omitted as appropriate except for differences.

The information processing device 10 analyzes the features of a document group including a plurality of documents generated in business assignments and the like. Then, the information processing device 10 simultaneously displays a plurality of images indicating the features of the document group.

Each of the documents included in the document group is data including text. The document may be any type of data as long as it includes at least text. The text may be any language or program code. Furthermore, a file format of the document may be any type of format as long as it can be handled by the information processing device 10.

The information processing device 10 extracts one or a plurality of key phrases from each of the documents included in the document group. The key phrase is a sentence in which a word or a plurality of words are arranged. More specifically, the key phrase is a word or a sentence indicating contents included in the document, a word or a sentence related to the document, or a word or a sentence indicating the features of the document. Note that the word and the sentence may be any type of language, may be a code string in a program code, or may be a number included in the text.

The information processing device 10 generates a plurality of clusters by clustering the key phrases extracted from the document group. Each of the clusters includes a plurality of items. The items are a plurality of key phrases included in each cluster. That is, each of the items is a word or a sentence.

Furthermore, the information processing device 10 extracts a sub-document group corresponding to a specified key phrase from the document group. The sub-document group is a part of the document group. The specified key phrase is one of the key phrases. That is, the specified key phrase is a word or a sentence.

The amount of information of the document group or the amount of information of the sub-document group is, for example, the number of documents included in the document group or the corresponding sub-document group. The amount of information of the document group or the amount of information of the sub-document group may be, for example, the number of characters included in the document group or the corresponding sub-document group, or the amount of data in the document group or the corresponding sub-document group.

First Embodiment

The first embodiment will be described.

FIG. 1 is a diagram illustrating a configuration of the information processing device 10 according to the first embodiment. The information processing device 10 includes a document group storage unit 12, a document acquisition unit 14, a pre-processing unit 16, a feature extraction unit 18, a clustering unit 20, a document information storage unit 22, a cluster information storage unit 24, an initial template storage unit 26, an initial image generation unit 28, a specified key phrase acquisition unit 32, a document extraction unit 34, a score calculation unit 36, a cluster selection unit 38, an image template storage unit 40, an image generation unit 42, and a display control unit 44.

The document group storage unit 12 stores therein a document group. The document acquisition unit 14 acquires documents, which are included in the document group stored in the document group storage unit 12, one by one in pre-processing.

In the pre-processing, the pre-processing unit 16 performs a text extraction process on each of the documents acquired by the document acquisition unit 14. For example, the pre-processing unit 16 extracts the text by deleting unnecessary parts other than the text included in the document.

In the pre-processing, the feature extraction unit 18 analyzes the text extracted by the pre-processing unit 16 for each of the documents acquired by the document acquisition unit 14, thereby extracting one or a plurality of key phrases. The feature extraction unit 18 associates the documents acquired by the document acquisition unit 14 with the extracted one key phrase or key phrases, and stores the associated documents in the document information storage unit 22.

In the pre-processing, the clustering unit 20 clusters the key phrases extracted from the document group, thereby generating a plurality of clusters each including a plurality of items. The clustering unit 20 generates a cluster list indicating the items included in each of the clusters. The clustering unit 20 stores the generated cluster list in the cluster information storage unit 24. Furthermore, the clustering unit 20 may generate an identification number for each of the clusters and put the identification numbers into the cluster list. Furthermore, the clustering unit 20 may generate, for each of the clusters, a representative word representing each cluster and put the representative words into the cluster list. Furthermore, the clustering unit 20 may analyze linguistic properties of the items included in each of the clusters and put language properties indicating the linguistic properties of the items into the cluster list.

The initial template storage unit 26 stores therein information for generating one initial image or each of a plurality of initial images. For example, the initial template storage unit 26 stores therein a query, which is given to a database stored in the document information storage unit 22 and the cluster list stored in the cluster information storage unit 24, for acquiring aggregated information that is the source of generation of the one initial image or the initial images. Furthermore, for example, the initial template storage unit 26 stores therein an image form for generating the one initial image or each of the initial images.

The initial image generation unit 28 acquires the query for acquiring the aggregated information, which is the source of the generation of the one initial image or the initial images, from the initial template storage unit 26 in an analysis process that is performed after the pre-processing. Then, the initial image generation unit 28 gives the acquired query to the database stored in the document information storage unit 22 and the cluster list stored in the cluster information storage unit 24, thereby acquiring the aggregated information.

Moreover, the initial image generation unit 28 acquires the image form for generating the one initial image or each of the initial images from the initial template storage unit 26. Then, the initial image generation unit 28 generates the one initial image or each of the initial images on the basis of the acquired aggregated information and image form. The initial image generation unit 28 gives the generated one initial image or initial images to the display control unit 44.

The specified key phrase acquisition unit 32 acquires a specified key phrase in the analysis process. For example, after the one initial image or the initial images are displayed, the specified key phrase acquisition unit 32 acquires a specified key phrase input by a user. Furthermore, for example, after the one initial image or the initial images are displayed, the specified key phrase acquisition unit 32 may acquire a specified key phrase automatically selected on the basis of display history, operation history, or the like.

When the specified key phrase is acquired, the document extraction unit 34 extracts a sub-document group corresponding to the specified key phrase from the document group. More specifically, the document extraction unit 34 extracts, from the document group, one or a plurality of documents including the specified key phrase in a corresponding one key phrase or a corresponding plurality of key phrases. Furthermore, for example, the document extraction unit 34 may extract, from the document group, one or a plurality of documents including a phrase similar to the specified key phrase or a phrase co-occurring with the specified key phrase in the corresponding one key phrase or the corresponding key phrases.

When the specified key phrase is acquired, the score calculation unit 36 calculates a score for each of the clusters included in the cluster list stored in the cluster information storage unit 24. The score indicates the usefulness of information indicated in a graph image. The graph image is an image indicating the amount of information for each of a plurality of items included in a corresponding cluster in the sub-document group corresponding to the specified key phrase. The higher the usefulness, the higher the score.

When the specified key phrase is acquired, the cluster selection unit 38 selects a plurality of clusters to be displayed whose scores are from the highest ranking to a predetermined ranking, among the clusters. The cluster selection unit 38 selects, for example, a maximum number of clusters to be displayed, whose graph images can be displayed in a predetermined range in a dashboard image. The dashboard image is an image capable of including a plurality of graph images and the like at the same time. The cluster selection unit 38 gives the image generation unit 42 information for identifying each of the clusters to be displayed.

The image template storage unit 40 stores therein an image form for generating a graph image indicating the amount of information for each of the items.

When the specified key phrase is acquired, the image generation unit 42 calculates the amount of information for each of the items in the sub-document group corresponding to the specified key phrase, for each of the clusters to be displayed. For example, the image generation unit 42 calculates the number of documents, which are included in the sub-document group corresponding to the specified key phrase, as the amount of information for each of a plurality of items included in a target cluster to be displayed. Furthermore, the image generation unit 42 may calculate the number of characters or the amount of data, which are included in the sub-document group corresponding to the specified key phrase, as the amount of information for each of the items included in the target cluster to be displayed.

Moreover, the image generation unit 42 acquires the image form stored in the image template storage unit 40. Then, the image generation unit 42 generates a graph image for each of the clusters to be displayed on the basis of the calculated amount of information for each of the items and the image form. The image generation unit 42 gives the generated graph images to the display control unit 44.

The display control unit 44 acquires the one initial image or the initial images in the analysis process. The display control unit 44 allows a monitor to display the one initial image or the initial images. For example, the display control unit 44 synthesizes and displays the one initial image or the initial images in the predetermined range of the dashboard image.

Furthermore, when the specified key phrase is acquired, the display control unit 44 acquires the graph image of each of the clusters to be displayed. When the graph image of each of the clusters to be displayed is acquired, the display control unit 44 allows the monitor to display the graph image of each of the clusters to be displayed, in addition to or in place of the one initial image or the initial images. For example, the display control unit 44 synthesizes and displays the graph image of each of the clusters to be displayed in the predetermined range of the dashboard image.

Note that the information processing device 10 may not be provided with the display control unit 44. In such a case, the display control unit 44 is implemented by a device other than the information processing device 10. For example, when the information processing device 10 is a server device on a network, the display control unit 44 may be implemented by a client device or a terminal device that communicates with the server device and performs image processing. In such a case, the display control unit 44 allows a monitor of the client device or the terminal device to display an image.

Figure 2:
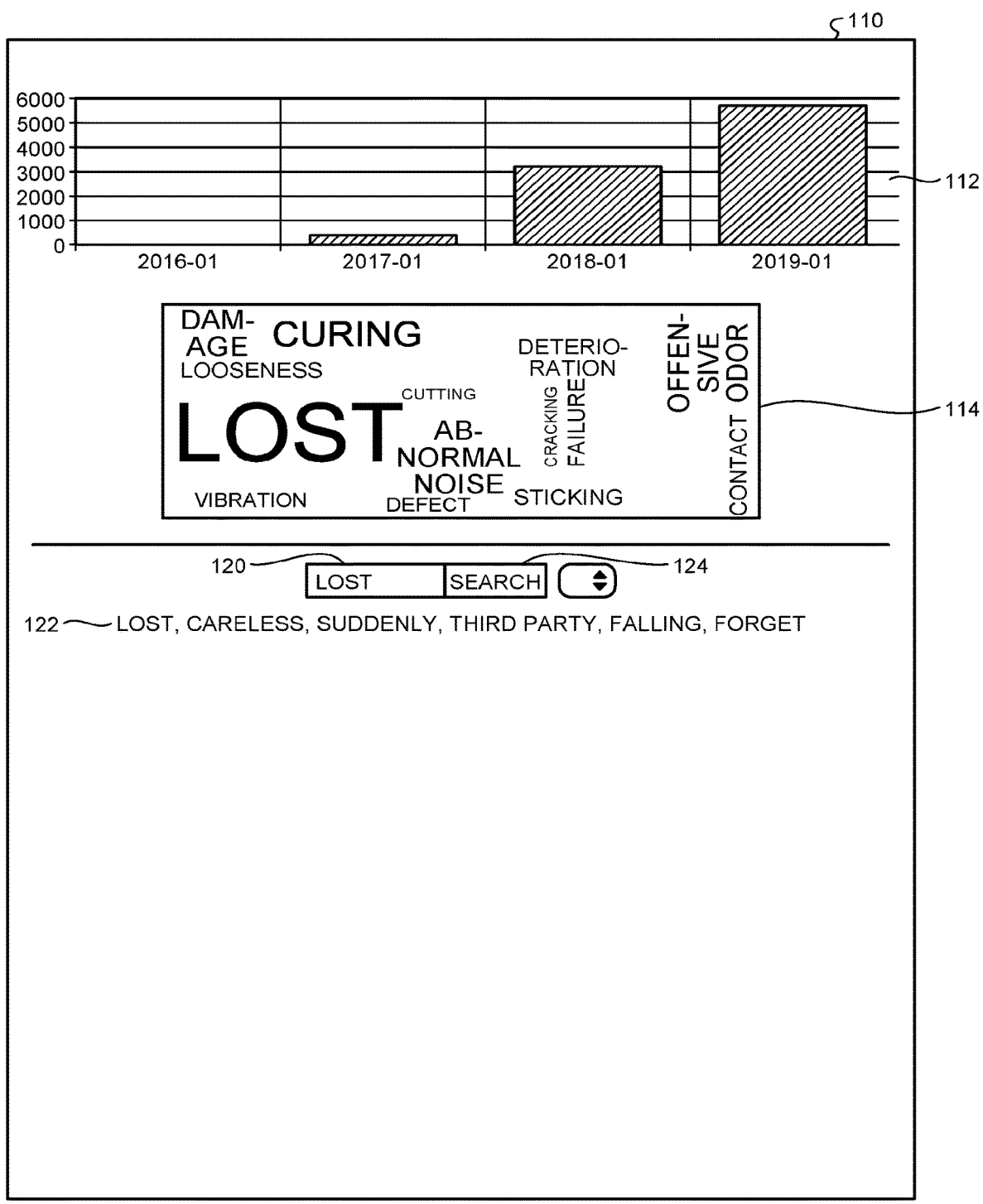
FIG. 2 is a diagram illustrating a display example of an initial image.

FIG. 2 is a diagram illustrating a first dashboard image 110, which is an example of the dashboard image including the initial image.

In the analysis process, the information processing device 10 displays the first dashboard image 110 as illustrated in FIG. 2 on the monitor as the dashboard image.

The first dashboard image 110 includes a first initial image 112, which is an example of the initial image, and a second initial image 114, which is an example of the initial image, in a first stage.

The first initial image 112 indicates a bar graph indicating the number of documents included in the document group for each year. In the first initial image 112, a horizontal axis denotes year and a vertical axis denotes the number of documents.

The second initial image 114 is a tag cloud chart indicating the key phrases extracted from the document group. For example, the tag cloud chart includes a plurality of key phrases whose display size, density, and the like are adjusted according to the frequency of occurrence and the like. Furthermore, in the tag cloud chart, fonts, colors, and directions of similar key phrases are shared, for example. Note that the initial image may be a Pareto chart in which a pie chart, a line graph, a bar graph, and a line graph indicating cumulative values are combined, a co-occurrence network diagram, and the like. Furthermore, the initial image may be a bar graph in which the horizontal axis denotes the clusters included in the cluster list and the vertical axis denotes the amount of information of corresponding clusters. Furthermore, when the number of the clusters included in the cluster list is large, the horizontal axis may denote some clusters with a large amount of information among the clusters included in the cluster list. Furthermore, when the number of the clusters included in the cluster list is large, the horizontal axis may denote a unit in which several clusters are gathered.

Moreover, the first dashboard image 110 includes an input box 120 for a user to input a specified key phrase. The information processing device 10 acquires a term, which is directly input to the input box 120 by the user, as a specified key phrase. Furthermore, the information processing device 10 may display a pull-down menu and the like including a plurality of key phrases, thereby allowing the user to select a specified key phrase.

Furthermore, in a case where the tag cloud chart is displayed as an initial image, when any key phrase included in the tag cloud chart is selected by the user, the information processing device 10 may acquire the selected key phrase as a specified key phrase. Furthermore, in a case where an initial image in which the horizontal axis denotes a plurality of clusters is displayed, when any cluster is selected by the user, the information processing device 10 may acquire a representative word of the selected cluster as a specified key phrase.

Moreover, the first dashboard image 110 includes item information 122. The item information 122 indicates a plurality of items included in a cluster corresponding to a specified key phrase input to the input box 120. For example, when a representative word of any cluster is temporarily input to the input box 120, the information processing device 10 displays the item information 122.

Furthermore, the first dashboard image 110 includes a search button 124. In a state in which a specified key phrase has been temporarily input to the input box 120, when the search button 124 is pressed, the information processing device 10 acquires the specified key phrase, generates a plurality of graph images, and adds the generated graph images to the first dashboard image 110.

Figure 3:
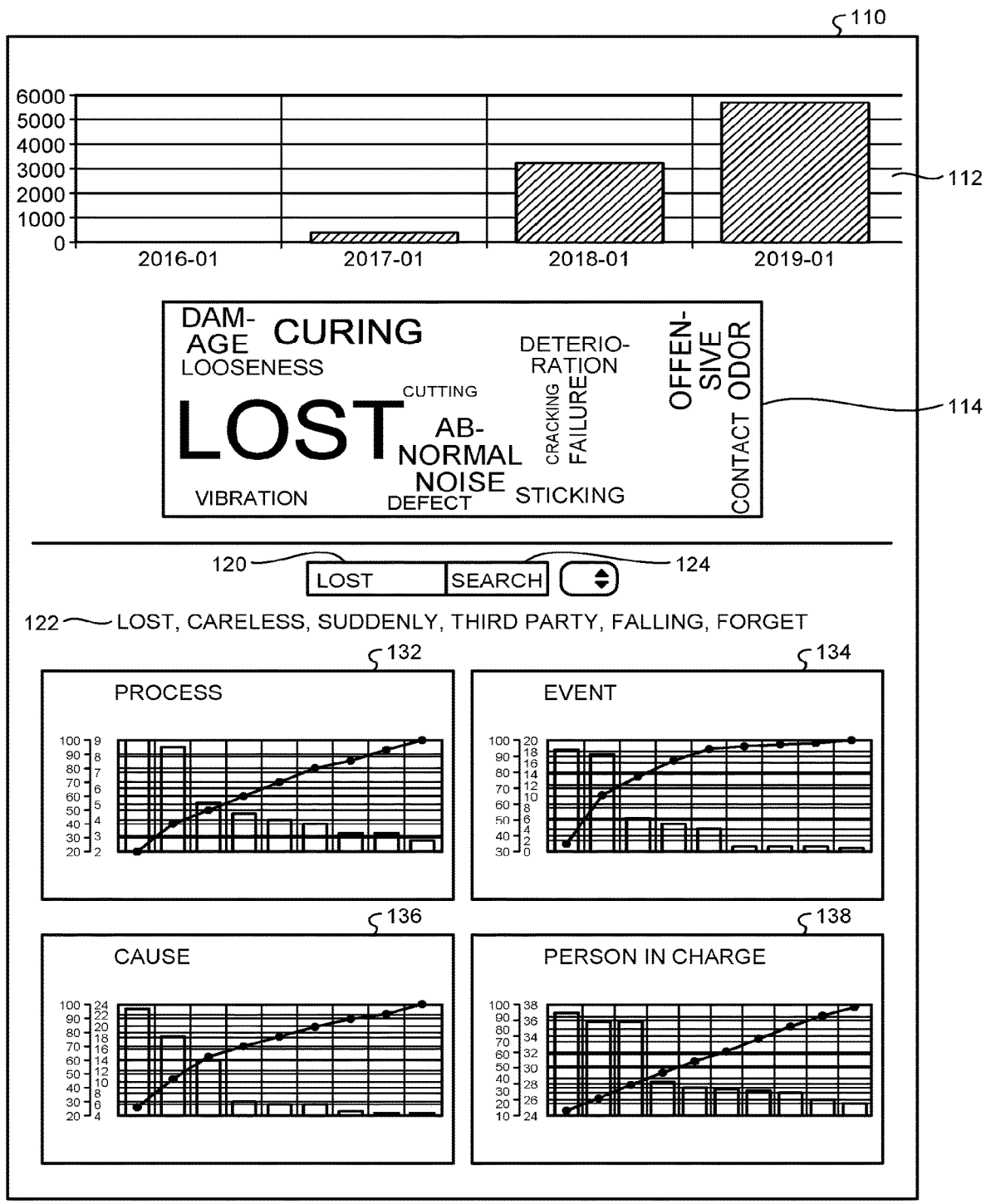
FIG. 3 is a diagram illustrating a display example of a graph image.

FIG. 3 is a diagram illustrating an example of the first dashboard image 110 including graph images. In the state in which the specified key phrase has been input to the input box 120, when the search button 124 is pressed, the information processing device 10 displays the first dashboard image 110 as illustrated in FIG. 3 on the monitor. Furthermore, for example, when a tag cloud chart such as the second initial image 114 is displayed, the information processing device 10 may display the first dashboard image 110 as illustrated in FIG. 3 on the monitor in response to the selection of any key phrase included in the tag cloud chart by the user.

The first dashboard image 110 illustrated in FIG. 3 further includes a first graph image 132, a second graph image 134, a third graph image 136, and a fourth graph image 138. Each of the first graph image 132, the second graph image 134, the third graph image 136, and the fourth graph image 138 is an example of a graph image displayed when "lost" is acquired as the specified key phrase.

The first graph image 132, the second graph image 134, the third graph image 136, and the fourth graph image 138 are graph images generated based on four clusters to be displayed whose scores are from the highest ranking to the fourth ranking, among the plurality of clusters.

The first graph image 132 is a bar graph indicating the amount of information for each of a plurality of items included in a cluster, whose representative word is "process", in a sub-document group extracted when "lost" is input as the specified key phrase. The second graph image 134 is a bar graph indicating the amount of information for each of a plurality of items included in a cluster, whose representative word is "event", in the sub-document group extracted when "lost" is input as the specified key phrase.

The third graph image 136 is a bar graph indicating the amount of information for each of a plurality of items included in a cluster, whose representative word is "cause", in the sub-document group extracted when "lost" is input as the specified key phrase. The fourth graph image 138 is a bar graph indicating the amount of information for each of a plurality of items included in a cluster, whose representative word is "person in charge", in the sub-document group extracted when "lost" is input as the specified key phrase.

Figure 4:
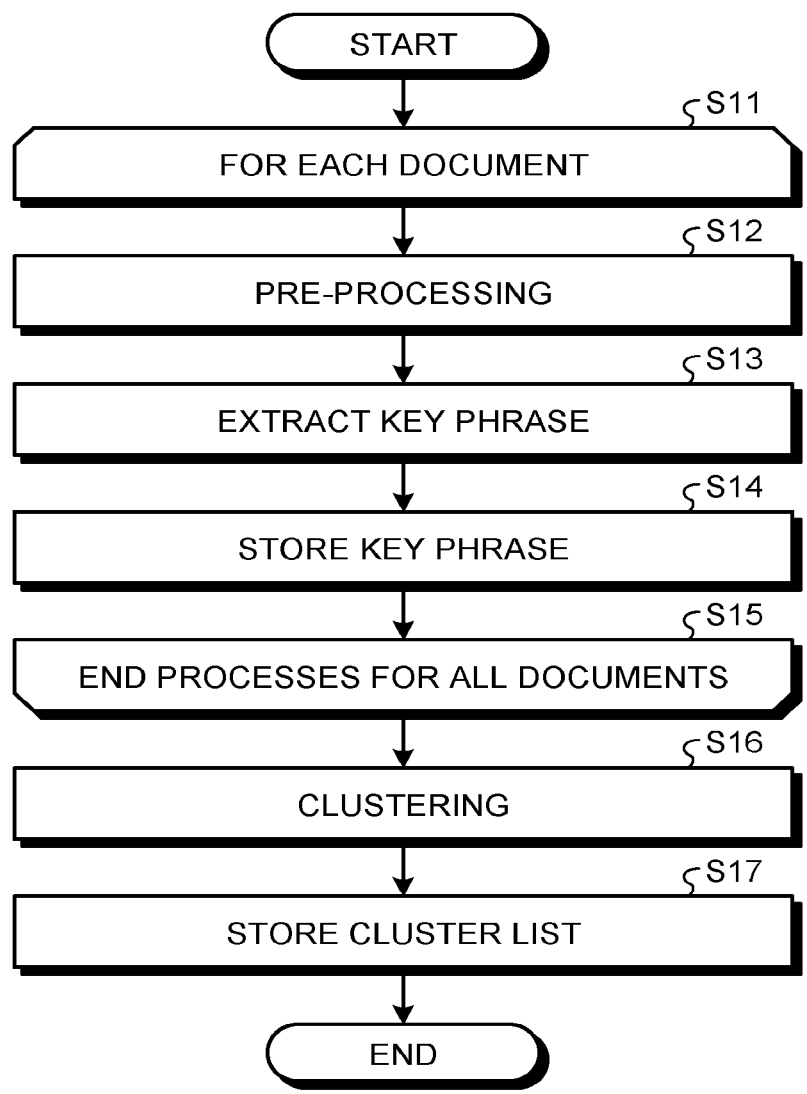
FIG. 4 is a flowchart illustrating the flow of pre-processing of the information processing device according to the first embodiment.

FIG. 4 is a flowchart illustrating the flow of the pre-processing of the information processing device 10 according to the first embodiment. FIG. 5 is a diagram illustrating an example of similar phrases. FIG. 6 is a diagram illustrating an example of a co-occurrence phrase. FIG. 7 is a diagram illustrating an example of a cluster list.

The information processing device 10 performs the pre-processing according to the flow illustrated in FIG. 4. In the pre-processing, the information processing device 10 first performs processes of S12 to S14 (loop process between S11 and S15) for each document included in the document group.

At S12, the information processing device 10 performs a text extraction process on a target document. For example, the information processing device 10 extracts text by deleting unnecessary parts other than the text included in the document.

More specifically, for example, the information processing device 10 extracts one or a plurality of data items and information contents corresponding to the one data item or each of the data items in consideration of a file format of the target document. The information processing device 10 analyzes the one data item or each of the data items, thereby specifying a data item including text indicating actual contents of the target document. Then, for example, the information processing device 10 deletes information (for example, a title, a symbol, and the like) depending on the specified data item from information contents corresponding to the specified data item, thereby acquiring the text.

Subsequently, at S13, the information processing device 10 performs, for example, morphological analysis, a compound word extraction process, and the like on the text extracted from the target document, thereby generating one or a plurality of key phrases for the acquired document.

Moreover, the information processing device 10 acquires distributed expression of each of the generated one key phrase or key phrases. Then, the information processing device 10 acquires one or a plurality of similar phrases for the generated one key phrase or each of the generated key phrases. For example, the information processing device 10 can give the key phrase in distributed expression to a neural network together with a word in distributed expression included before and after the text, thereby acquiring a similar phrase similar to the key phrase together with the degree of similarity.

For example, as illustrated in FIG. 5, when "obstacle" is a key phrase, the information processing device 10 acquires "pedestrian", "car", and the like as similar phrases. Furthermore, when "overturning" is a key phrase, the information processing device 10 acquires "injury", "falling", and the like as similar phrases. The information processing device 10 acquires, for example, a predetermined number of similar phrases having a higher degree of similarity in a descending order, for each of the key phrases. Furthermore, as illustrated in the parentheses in FIG. 5, the information processing device 10 may acquire numerical values indicating the degree of similarity together with the similar phrases.

Moreover, for the generated one key phrase or each of the generated key phrases, the information processing device 10 may acquire one or a plurality of co-occurrence phrases that are likely to be included in the same sentence together with the key phrase. For example, on the basis of co-occurrence information of words appearing in the sentence, the information processing device 10 acquires a co-occurrence phrase for the key phrase. Furthermore, for example, the information processing device 10 may calculate a coefficient indicating the possibility that the co-occurrence phrase is included in the same sentence, together with the co-occurrence phrase on the basis of the Jaccard index and the like.

For example, as illustrated in FIG. 6, when "deficiency" is a key phrase, the information processing device 10 acquires "place" as a co-occurrence phrase. In such a case, the information processing device 10 calculates 0.08550 as a coefficient.

Subsequently, at S14, the information processing device 10 associates a corresponding document with the extracted one key phrase or key phrases and stores the associated document in the document information storage unit 22. Moreover, when the similar phrases and the co-occurrence phrase have been acquired, the information processing device 10 also stores them in the document information storage unit 22.

When the information processing device 10 has ended the processes of S13 and S14 for all the documents included in the document group (S15), the information processing device 10 proceeds to the process of S16.

At S16, the information processing device 10 clusters the key phrases included in the document group, thereby generating a plurality of clusters each including a plurality of items. For example, the information processing device 10 generates the clusters by a bottom-up clustering method such as a k-means method. For example, the information processing device 10 presets a threshold value for the number of clusters and performs clustering until the number of clusters reaches the threshold value.

For example, as illustrated in FIG. 7, the information processing device 10 generates a cluster list indicating the items included in each of the clusters. The information processing device 10 assigns an identification number for identifying the clusters to each of the clusters and puts the clusters into the cluster list. Furthermore, the information processing device 10 generates a representative word representing each of the clusters and puts the representative words into the cluster list. The representative word may be any one of a plurality of items included in a corresponding cluster, or a term indicating a concept common to the items.

Moreover, the information processing device 10 analyzes linguistic properties of the items included in each of the clusters, specifies language properties indicating the linguistic properties of the items, and puts the specified language properties into the cluster list. For example, the information processing device 10 may determine whether the items included in the corresponding cluster indicate an object or an action, and use the determination result as the language property of the corresponding cluster. For example, when the items include a large number of nouns, items, model numbers, device names, and the like, the information processing device 10 may determine that the items indicate the object. Furthermore, for example, when the items include a large number of phenomena, operations, and the like, the information processing device 10 may determine that the items indicate the action. Furthermore, the information processing device 10 may analyze contents indicated by the items in more detail and determine the language property by distinguishing them in more detail.

Subsequently, at S17, the information processing device 10 stores the generated cluster list in the cluster information storage unit 24. When the process of S17 ends, the information processing device 10 ends the flow of the pre-processing of FIG. 4.

FIG. 8 is a flowchart illustrating the flow of the analysis process of the information processing device 10 according to the first embodiment. After the pre-processing illustrated in FIG. 4 ends, the information processing device 10 performs the analysis process illustrated in FIG. 8 in response to an instruction of a user and the like.

First, at S21, the information processing device 10 generates one or a plurality of initial images set in advance. For example, the information processing device 10 acquires a query from the initial template storage unit 26 for the one initial image or each of the initial images. Then, the information processing device 10 gives the acquired query to the document information storage unit 22 and the cluster information storage unit 24, thereby acquiring aggregated information for generating the one initial image or each of the initial images.

Moreover, the information processing device 10 acquires an image form from the initial template storage unit 26 for the one initial image or each of the initial images. Then, the information processing device 10 generates the one initial image or each of the initial images on the basis of the acquired aggregated information and image form.

Subsequently, at S22, the information processing device 10 allows the monitor to display the one initial image or the initial images. In such a case, the information processing device 10 synthesizes the one initial image or the initial images on the dashboard image and allows the monitor to display the synthesized image, for example.

Subsequently, at S23, the information processing device 10 acquires a specified key phrase specified by a user. Instead of this, the information processing device 10 may acquire a specified key phrase automatically selected on the basis of display history, operation history, or the like.

Subsequently, at S24, the information processing device 10 extracts a sub-document group corresponding to the specified key phrase from the document group. More specifically, the information processing device 10 extracts, from the document group, one or a plurality of documents including the specified key phrase in a corresponding one key phrase or a corresponding plurality of key phrases. Furthermore, the information processing device 10 may extract, from the document group, one or a plurality of documents including a phrase similar to the specified key phrase or co-occurring with the specified key phrase in the corresponding one key phrase or the corresponding key phrases.

Subsequently, in the loop process of S25 to S27, the information processing device 10 calculates scores for the clusters included in the cluster list stored in the cluster information storage unit 24. The score indicates the usefulness of information indicated in a graph image indicating the amount of information for each of a plurality of items included in a corresponding cluster in the sub-document group corresponding to the specified key phrase. The higher the usefulness, the higher the score. Details of an example of calculating the score will be described below. When the information processing device 10 have calculated scores for all of the clusters, the information processing device 10 proceeds to the process of S28.

At S28, the information processing device 10 selects a plurality of clusters to be displayed whose calculated scores are from the highest ranking to a predetermined ranking, among the plurality of clusters. The information processing device 10 selects, for example, a maximum number of clusters to be displayed, whose graph images can be displayed in a predetermined display area in the dashboard image.

Subsequently, at S29, the information processing device 10 generates graph images respectively corresponding to the clusters to be displayed. For example, the information processing device 10 calculates the amount of information for each of the items in the sub-document group corresponding to the specified key phrase, for each of the clusters to be displayed. For example, the information processing device 10 calculates the number of documents, which are included in the sub-document group, as the amount of information for each of the items included in a target cluster to be displayed. Furthermore, the information processing device 10 may calculate the number of characters or the amount of data, which are included in the sub-document group, as the amount of information for each of the items included in the target cluster to be displayed.

Moreover, the information processing device 10 acquires the image form stored in the image template storage unit 40. Then, the information processing device 10 generates a graph image for each of the clusters to be displayed on the basis of the calculated amount of information for each of the items and the image form.

Subsequently, at S30, the information processing device 10 adds the graph images of the clusters to be displayed to the one initial image or the initial images and allows the monitor to display the graph images. For example, the information processing device 10 synthesizes and displays the graph image of each of the clusters to be displayed together with the one initial image or the initial images on the dashboard image.

After the end of S30, the information processing device 10 according to the first embodiment ends the flow of the analysis process.

Next, the score of each of the clusters, which is calculated by the score calculation unit 36 of the information processing device 10 in the first embodiment, will be described.

The information processing device 10 performs the operation of the following Equation (1) on the i-th cluster (i is an integer of 1 or more), and calculates the score.

$$Sx(i)=A \times B \qquad (1)$$

A denotes a value according to the coverage of the i-th cluster. The coverage indicates the ratio of the amount of information of a plurality of documents belonging to a cluster to be calculated (i-th cluster) to the amount of information of the document group. For example, A is a positive integer. A increases as the coverage increases.

B is a value according to the degree of concentration of the amount of information for each of a plurality of items included in the cluster to be calculated (i-th cluster) on a specific item in the sub-document group corresponding to the specified key phrase. More specifically, B increases as the amount of information for each of the items included in the cluster to be calculated (i-th cluster) is concentrated on the specific item, and decreases as the amount of information for each of the items included in the cluster to be calculated is dispersed among a larger number of items. For example, B is a positive integer. B increases as the reciprocal of the variance increases. For example, B may be a value according to the reciprocal of the variance of the amount of information for each of the items included in the cluster to be calculated.

The usefulness increases as Sx(i) increases. Accordingly, the information processing device 10 selects a predetermined number of clusters to be displayed in descending order of Sx(i) among the clusters.

Here, Sx(i) increases as A increases. Accordingly, the information processing device 10 increases the score for the cluster to be calculated assuming that as the coverage increases, the usefulness of information indicated in the graph image increases. A graph image of a cluster with a large coverage indicates features close to the overall features of the document group, and can make a user aware of the overall tendency of the document group.

In this way, the information processing device 10 calculates the score on the basis of the coverage indicating the ratio of the amount of information of the documents belonging to the cluster to be calculated to the amount of information of the document group. In such a case, the information processing device 10 increases the score as the coverage increases. With this, the information processing device 10 can display a graph image for a cluster close to the overall features of the document group, thereby providing useful information to a user.

Furthermore, Sx(i) increases as B increases. Accordingly, the information processing device 10 increases the score for the cluster to be calculated assuming that as the degree of concentration (that is, the degree by which the amount of information is concentrated on the specific item) increases, the usefulness of information indicated in the graph image increases. A graph image of a cluster with a high degree of concentration indicates a graph in which the amount of information of a specific item is remarkably large and the amount of information of a plurality of other items is small.

Such a graph image indicates peculiar features of the sub-document group, and can give a new awareness to a user.

In this way, the information processing device 10 calculates the score for the cluster to be calculated on the basis of the degree of concentration of the amount of information for each of the items in the sub-document group. In such a case, the information processing device 10 increases the score as the degree of concentration increases. With this, the information processing device 10 can display a graph image of a cluster, which indicates the peculiar features of the sub-document group, thereby providing useful information to a user.

Equation (1) above represents the multiplication of A and B. However, Equation (1) above may be another operation (for example, addition of A and B) as long as Sx(i) increases as A increases and Sx(i) increases as B increases.

As described above, the information processing device 10 according to the present embodiment generates a plurality of clusters by clustering a plurality of key phrases extracted from a document group. Moreover, when a specified key phrase is acquired, the information processing device 10 calculates a score for each of the clusters. Then, the information processing device 10 displays a plurality of graph images corresponding to a plurality of clusters to be displayed whose scores are from the highest ranking to a predetermined ranking.

With this, the information processing device 10 according to the present embodiment can display a graph image that provides useful information to a user.

Second Embodiment

Next, the second embodiment will be described.

An information processing device 10 according to the second embodiment has the same configuration as the information processing device 10 according to the first embodiment. The information processing device 10 according to the second embodiment is different from the first embodiment in that a specified key phrase is acquired a plurality of times.

FIG. 9 is a flowchart illustrating the flow of an analysis process of the information processing device 10 according to the second embodiment.

The information processing device 10 according to the second embodiment performs the processes of S21 to S30 in the analysis process in the same manner as in the first embodiment. However, the information processing device 10 according to the second embodiment does not end the flow of the analysis process after the end of S30, returns to the process of S23, and acquires the specified key phrase again. Then, the information processing device 10 according to the second embodiment repeatedly performs the processes of S23 to S30 whenever acquiring a specified key phrase.

FIG. 10 is a diagram illustrating the transition of an image displayed by the information processing device 10 according to the second embodiment.

For example, it is assumed that the information processing device 10 acquires a first key phrase as a specified key phrase after an initial image is displayed. In such a case, for the first key phrase, the information processing device 10 extracts a sub-document group, calculates a score for each of a plurality of clusters, selects a plurality of clusters to be displayed, generates a graph image of each of the clusters to be displayed, and displays the graph image of each of the clusters to be displayed.

Subsequently, it is assumed that the information processing device 10 acquires a second key phrase as a specified key phrase after the graph image of each of the clusters to be displayed, which has been selected for the first key phrase, is displayed. In such a case, for the second key phrase, the information processing device 10 extracts a sub-document group, calculates a score for each of a plurality of clusters, selects a plurality of clusters to be displayed, generates a graph image of each of the clusters to be displayed, and displays the graph image of each of the clusters to be displayed.

In such a case, the information processing device 10 displays the graph image of each of the clusters to be displayed, which has been selected for the second key phrase, in addition to the graph image of each of the clusters to be displayed, which has been selected for the first key phrase. With this, the information processing device 10 can present features of the sub-document group corresponding to the first key phrase and features of the sub-document group corresponding to the second key phrase to a user side by side. Note that the information processing device 10 may further perform the process similarly after a third key phrase which is a specified key phrase specified after the second key phrase.

Furthermore, for the second key phrase, the information processing device 10 extracts the sub-document group corresponding to the second key phrase from the entire document group. With this, the information processing device 10 can present to a user the features of the sub-document group corresponding to the second key phrase in the entire document group.

Furthermore, for the second key phrase, the information processing device 10 may extract the sub-document group corresponding to the second key phrase from the sub-document group corresponding to the first key phrase. With this, the information processing device 10 can present to a user the features of a sub-document group in which the sub-document group corresponding to the first key phrase is further drilled down with the second key phrase.

Next, the score of each of the clusters, which is calculated by the score calculation unit 36 of the information processing device 10 in the second embodiment, will be described.

First, the information processing device 10 calculates a score for the first key phrase in the same manner as in the first embodiment. That is, the information processing device 10 performs the operation expressed by Equation (1) above and calculates the score.

When the second key phrase is acquired, the information processing device 10 performs the operation of the following Equation (2) on the i-th cluster (i is an integer of 1 or more), and calculates the score.

$$Sx(i) = A \times B \times C \quad (2)$$

In Equation (2) above, A and B are the same as in Equation (1) above.

C denotes a value according to the degree of difference indicating the difference between the language properties of a plurality of items included in the i-th cluster and the language properties of a plurality of items included in each of the clusters to be displayed, which have been selected for the first key phrase. More specifically, C increases as the language property of each of a plurality of items included in a cluster to be calculated (i-th cluster) and the language properties of the items included in each of the clusters to be displayed, which have been selected for the first key phrase, are different, and decreases as they are similar. For example, C is a positive integer. C increases as the degree of difference increases. For example, C may be a value according to the reciprocal of the degree of similarity between the language properties of the items included in the i-th cluster and the language properties of a plurality of items included in each of the clusters to be displayed, which have been selected for the first key phrase.

Here, $Sx(i)$ increases as C increases. Accordingly, the information processing device 10 increases the score for the cluster to be calculated (i-th cluster) assuming that as the degree of difference increases, the usefulness of information indicated in the graph image increases. A graph image of a cluster with a high degree of difference is another type of graph image that has not been displayed so far, and can give a new awareness to a user.

For example, the information processing device 10 increases the score for the clusters to be displayed as the ratio of clusters having the same language property as that of the cluster to be calculated (i-th cluster) decreases. More specifically, for example, when the language property of the i-th cluster is an object, the information processing device 10 increases the score for the clusters to be displayed assuming that the degree of difference increases as the ratio of clusters whose language property is an object is small. Furthermore, for example, when the language property of the i-th cluster is an action, the information processing device 10 increases the score for the clusters to be displayed assuming that the degree of difference increases as the ratio of clusters whose language property is an action is small.

Equation (2) above represents the multiplication of A, B, and C. However, Equation (2) above may be another operation (for example, addition of A, B, and C) as long as $Sx(i)$ increases as each of A, B, and C increases.

Furthermore, even when the third key phrase is specified as a specified key phrase after the second key phrase, the information processing device 10 performs the operation of Equation (2) above on the i-th cluster and calculates the score. In such a case, C denotes a value according to the degree of difference between the language properties of the items included in the i-th cluster and the language properties of the items included in each of the clusters to be displayed selected so far. The same applies to fourth and subsequent key phrases.

The information processing device 10 according to the present embodiment as described above can display a graph image that provides useful information to a user when simultaneously displaying a plurality of graph images indicating the features of a sub-document group corresponding to each of a plurality of key phrases.

Third Embodiment

Next, the third embodiment will be described.

Figure 11:
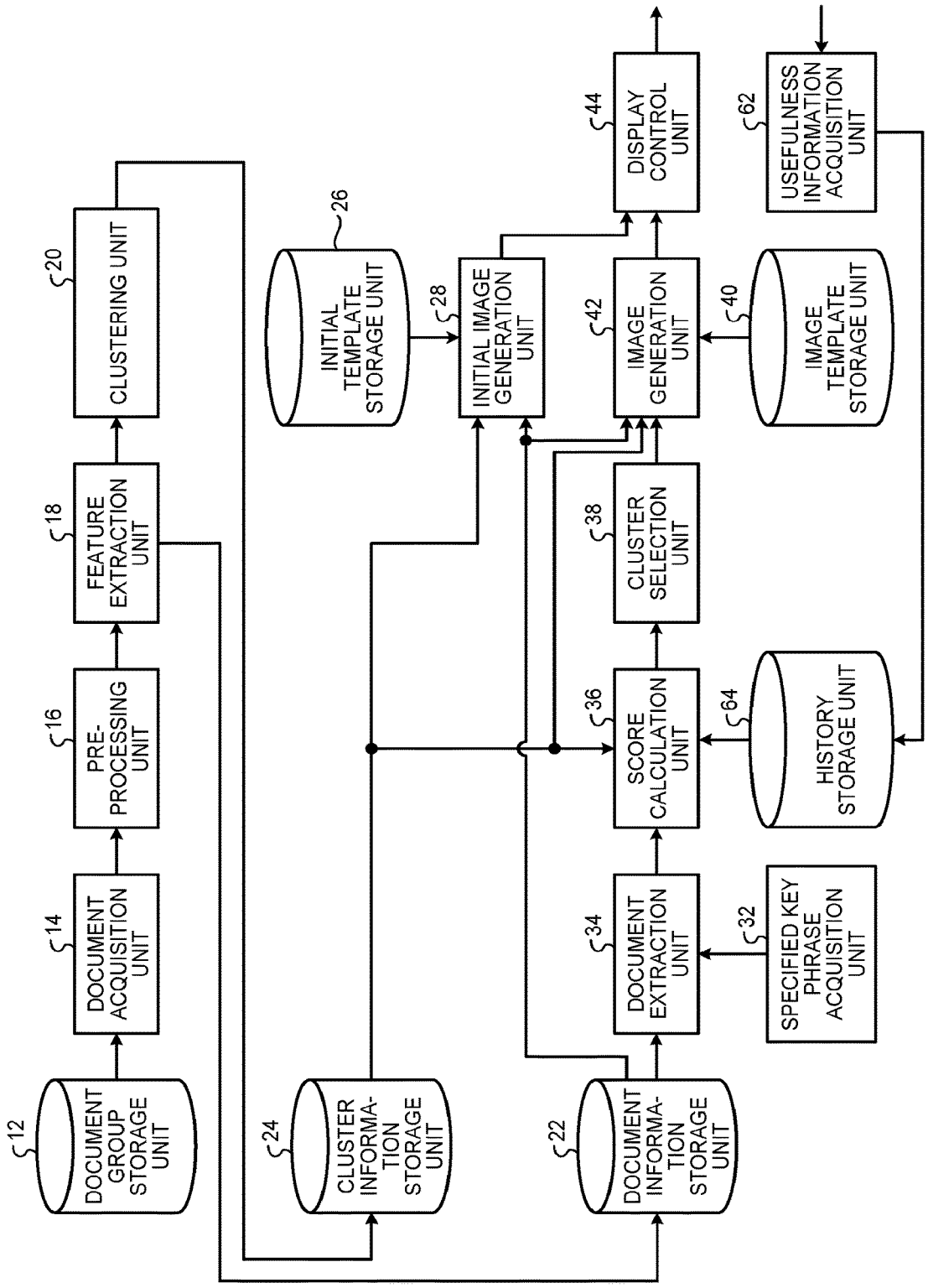
FIG. 11 is a diagram illustrating a configuration of an information processing device according to a third embodiment.

FIG. 11 is a diagram illustrating a configuration of an information processing device 10 according to the third embodiment. The information processing device 10 according to the third embodiment has the same configuration as the information processing device 10 according to the first embodiment and the second embodiment does.

The information processing device 10 according to the third embodiment further includes a usefulness information acquisition unit 62 and a history storage unit 64, as compared with the first embodiment and the second embodiment.

The usefulness information acquisition unit 62 accepts a usefulness determination result by a user with respect to the graph image of each of the clusters to be displayed for the specified key phrase.

For example, the display control unit 44 displays the graph image of each of the clusters to be displayed, and displays a user interface such as a button for inputting a determination result regarding whether it is useful while checking against each graph image. Then, the usefulness information acquisition unit 62 acquires a result of input through the user interface as the usefulness determination result. Furthermore, after the graph image of each of the clusters to be displayed is displayed, the usefulness information acquisition unit 62 may acquire whether the graph image is removed by operation of a user. In such a case, the usefulness information acquisition unit 62 acquires a graph image removed by operation of the user as the determination result that it is not useful to the user.

The history storage unit 64 stores therein history information including a set of a specified key phrase and the determination result accepted from the user. The history storage unit 64 may store therein history information further including a user ID for identifying a user who is using the information processing device 10.

Furthermore, in the third embodiment, the score calculation unit 36 calculates the score for each of a plurality of clusters on the basis of the history information on the specified key phrase. For example, the score calculation unit 36 increases the score as a cluster to be calculated is indicated by the history information to be more useful for the specified key phrase.

For example, when the user has determined in the past that the graph image of the cluster to be calculated is useful for analyzing a sub-document group corresponding to the specified key phrase, the score calculation unit 36 increases the score. On the contrary, when the user has determined that it is not useful, the score calculation unit 36 decreases the score.

Furthermore, for example, when a preset user has determined in the past that the graph image of the cluster to be calculated is useful for analyzing the sub-document group corresponding to the specified key phrase, the score calculation unit 36 increases the score. The preset user is, for example, an experienced user, and the like.

The information processing device 10 according to the present embodiment as described above can display a graph image that provides more useful information to a user, on the basis of the past determination result of a user.

Fourth Embodiment

Next, the fourth embodiment will be described.

Figure 12:
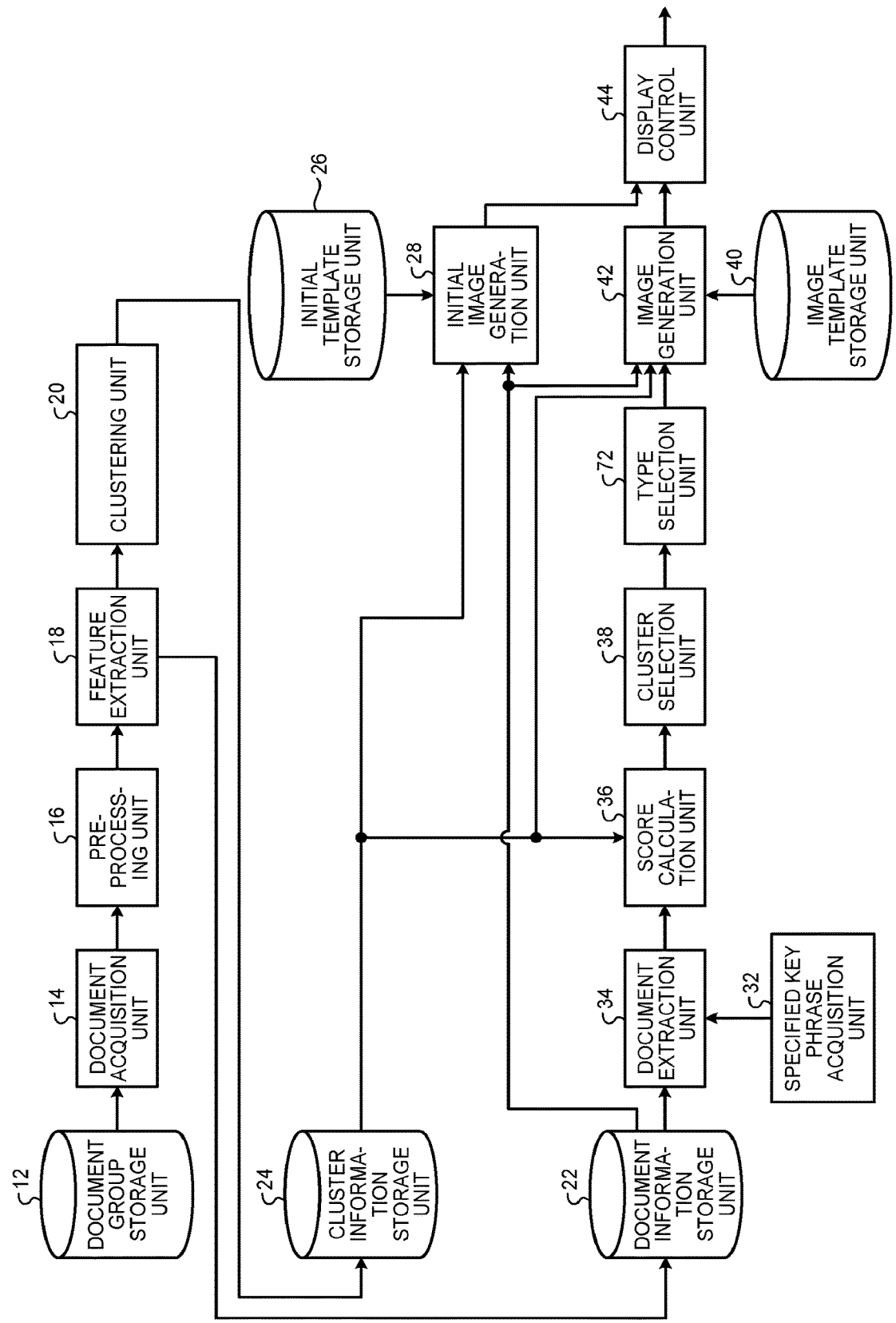
FIG. 12 is a diagram illustrating a configuration of an information processing device according to a fourth embodiment.

FIG. 12 is a diagram illustrating a configuration of an information processing device 10 according to the fourth embodiment. The information processing device 10 according to the fourth embodiment has the same configuration as the information processing device 10 according to the first embodiment, the second embodiment, and the third embodiment does.

The information processing device 10 according to the fourth embodiment further includes a type selection unit 72, as compared with the first embodiment, the second embodiment, and the third embodiment.

The image template storage unit 40 stores therein a plurality of types of image forms for generating a graph image. For example, the image template storage unit 40 stores therein an image form for generating a bar graph, an image form for displaying a pie chart, and an image form for displaying a Pareto chart. The image template storage unit 40 may store therein information for generating a graph image other than them.

Moreover, the image template storage unit 40 may store therein an image form for generating a plurality of feature images indicating the features of clusters, other than the graph image. For example, the image template storage unit 40 may store therein an image form for generating a tag cloud chart and an image form for generating a co-occurrence network diagram.

The type selection unit 72 selects an image form, which is to be used for generating the graph image, from among the types of image forms for generating the graph image, with regard to each of the clusters to be displayed, which has been selected by the cluster selection unit 38. For example, the type selection unit 72 calculates an evaluation value for each of the types of image forms with regard to each of the clusters to be displayed, and selects an image form having the highest evaluation value.

Moreover, the type selection unit 72 selects a predetermined number of images from among the feature images indicating the features of the clusters, other than the graph image, and the graph image of each of the clusters to be displayed. The predetermined number is, for example, the maximum number of images that can be included in the predetermined range of the dashboard image.

The type selection unit 72 calculates an evaluation value for each of the feature images and each of the graph images, for example. The evaluation value indicates the usefulness of information indicated in the image. The type selection unit 72 selects images whose evaluation values are from the highest ranking to a predetermined ranking from among the feature images and the graph images.

The image generation unit 42 generates the images selected by the type selection unit 72, from among the feature images and the graph images. Then, the display control unit 44 synthesizes and displays the images generated by the image generation unit 42, in the predetermined range of the dashboard image.

Figure 13:
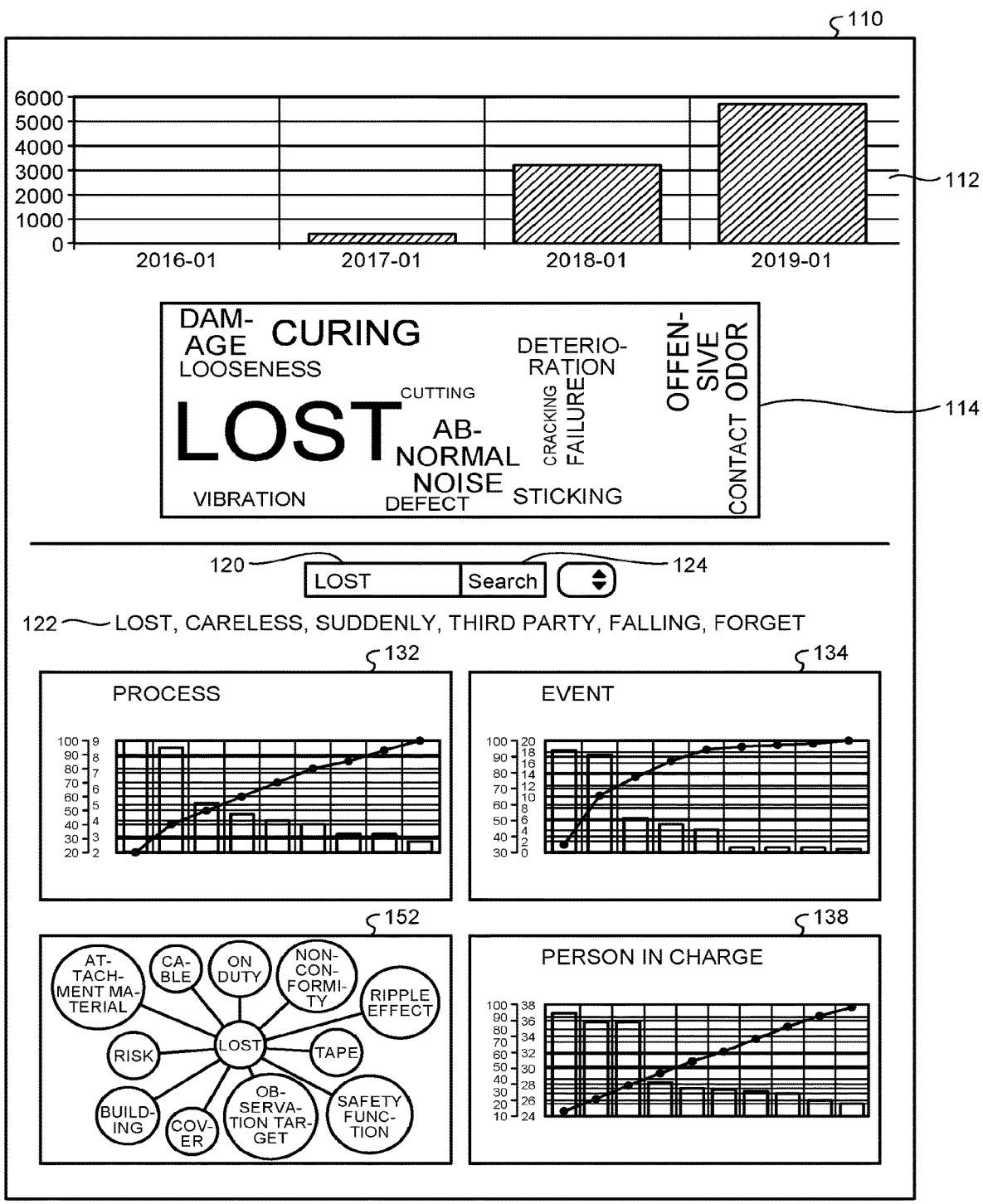
FIG. 13 is a diagram illustrating a display example of an image displayed by the information processing device according to the fourth embodiment.

FIG. 13 is a diagram illustrating a display example of an image by the information processing device 10 according to the fourth embodiment.

In the fourth embodiment, in a state in which the specified key phrase has been input to the input box 120, when the search button 124 is pressed, the information processing device 10 displays the first dashboard image 110 as illustrated in FIG. 13 on the monitor.

The first dashboard image 110 illustrated in FIG. 13 includes a co-occurrence network image 152 in addition to the first graph image 132, the second graph image 134, and the third graph image 136. In this way, the information processing device 10 according to the fourth embodiment can display a feature image such as the co-occurrence network image 152 indicating the features of the sub-document group, in addition to the graph images.

As described above, the information processing device 10 according to the present embodiment can display an image that provides more useful information to a user among various types of images.

Hardware Configuration

Figure 14:
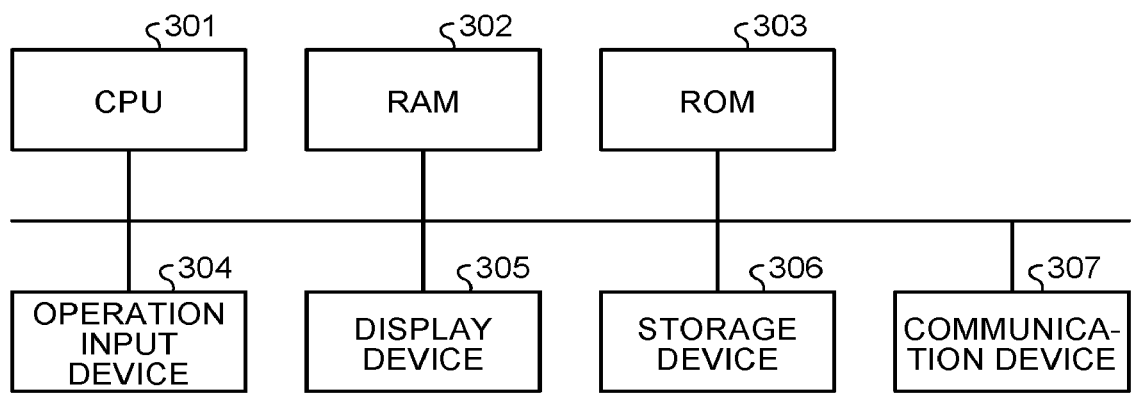
FIG. 14 is a diagram illustrating a hardware configuration of the information processing device.

FIG. 14 is a diagram illustrating a hardware configuration of the information processing device 10 according to an embodiment. The information processing device 10 is implemented by, for example, a computer having a hardware configuration as illustrated in FIG. 14. The information processing device 10 includes a central processing unit (CPU) 301, a random-access memory (RAM) 302, a read-only memory (ROM) 303, an operation input device 304, a display device 305, a storage device 306, and a communication device 307. These components are connected by a bus.

The CPU 301 is a processor that performs an arithmetic process, a control process, and the like according to a computer program. The CPU 301 uses a predetermined area of the RAM 302 as a working area and performs various processes in cooperation with computer programs stored in the ROM 303, the storage device 306, and the like.

The RAM 302 is a memory such as a synchronous dynamic random-access memory (SDRAM). The RAM 302 serves as the working area of the CPU 301. The ROM 303 is a memory that stores therein the computer program and various information in a non-rewritable manner.

The operation input device 304 is an input device such as a mouse and a keyboard. The operation input device 304 accepts information, which is input through operation of a user, as an instruction signal, and outputs the instruction signal to the CPU 301.

The display device 305 is a display device such as a liquid crystal display (LCD). The display device 305 displays various information on the basis of a display signal from the CPU 301.

The storage device 306 is a device that writes and reads data to/from a storage medium made of a semiconductor such as a flash memory, a magnetically or optically recordable storage medium, or the like. The storage device 306 writes and reads data to/from the storage medium under the control of the CPU 301. The communication device 307 communicates with external devices via a network under the control of the CPU 301.

The computer program executed by the information processing device 10 has a module configuration including a document acquisition module, a pre-processing module, a feature extraction module, a clustering module, an initial image generation module, a specified key phrase acquisition module, a document extraction module, a score calculation module, a cluster selection module, an image generation module, and a display control module. The computer program is loaded in the RAM 302 and executed by the CPU 301 (processor), thereby causing the information processing device 10 to serve as the document acquisition unit 14, the pre-processing unit 16, the feature extraction unit 18, the clustering unit 20, the initial image generation unit 28, the specified key phrase acquisition unit 32, the document extraction unit 34, the score calculation unit 36, the cluster selection unit 38, the image generation unit 42, and the display control unit 44. Note that some or all of the document acquisition unit 14, the pre-processing unit 16, the feature extraction unit 18, the clustering unit 20, the initial image generation unit 28, the specified key phrase acquisition unit 32, the document extraction unit 34, the score calculation unit 36, the cluster selection unit 38, the image generation unit 42, and the display control unit 44 may be implemented by a hardware circuit. Furthermore, the RAM 302 and the storage device 306 serve as the document information storage unit 22, the cluster information storage unit 24, the initial template storage unit 26, and the image template storage unit 40.

Furthermore, the computer program executed by the information processing device 10 is recorded on a computer-readable recording medium, such as a CD-ROM, a flexible disk, a CD-R, and a digital versatile disc (DVD), as a file in a format installable or executable on a computer, and provided.

Furthermore, the computer program executed by the information processing device 10 may be configured to be stored on a computer connected to a network such as the Internet and downloaded via the network, and provided. Furthermore, the computer program executed by the information processing device 10 may be configured to be provided or distributed via the network such as the Internet.

Furthermore, the computer program executed by the information processing device 10 may be configured to be incorporated into the ROM 303 or the like in advance, and provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
one or more processors coupled to the memory and configured to:
cluster a plurality of key phrases extracted from a document group to generate a plurality of clusters each including a plurality of items;
extract a sub-document group corresponding to a specified key phrase from the document group;
calculate a score for each of the plurality of clusters, the score indicating usefulness of information displayed in a graph image that indicates an amount of information for each of the plurality of items in the sub-document group;
select a plurality of clusters to be displayed whose scores are from a highest ranking to a predetermined ranking, among the plurality of clusters; and
generate the graph image of each of the plurality of clusters to be displayed, wherein
the one or more processors are further configured to calculate the score based on a coverage indicating a ratio of an amount of information of a plurality of documents belonging to a cluster to be calculated to an amount of information of the document group.

2. The device according to claim 1, wherein
each document included in the document group is data including text, and
each of the plurality of key phrases, the plurality of items, and the specified key phrase is a word or a sentence.

3. The device according to claim 1, wherein the one or more processors are configured to calculate the score based on a degree of concentration, of an amount of information for each of the plurality of items included in a cluster to be calculated, on a specific item in the sub-document group.

4. The device according to claim 3, wherein the one or more processors are configured to increase the score as the degree of concentration increases.

5. The device according to claim 1, wherein the one or more processors are configured to increase the score as the coverage increases.

6. The device according to claim 1, wherein
for a first key phrase that is the specified key phrase, the one or more processors are configured to:
extract the sub-document group;
calculate the score for each of the plurality of clusters;
select the plurality of clusters to be displayed; and
generate the graph image of each of the plurality of clusters to be displayed, and
after the graph image of each of the plurality of clusters to be displayed, which are selected for the first key phrase, is displayed, for a second key phrase that is the specified key phrase, the one or more processors are configured to:
extract the sub-document group;
calculate the score for each of the plurality of clusters;
select the plurality of clusters to be displayed; and
generate the graph image of each of the plurality of clusters to be displayed.

7. The device according to claim 6, wherein the one or more processors are configured to:
extract the sub-document group corresponding to the first key phrase from the document group; and
extract the sub-document group corresponding to the second key phrase from the sub-document group corresponding to the first key phrase.

8. The device according to claim 6, wherein, when the score is calculated for the second key phrase, the one or more processors are configured to calculate the score based on a value according to a degree of difference indicating a difference between language properties of the plurality of items included in a cluster to be calculated and language properties of the plurality of items included in each of the plurality of clusters to be displayed which are selected for the first key phrase.

9. The device according to claim 8, wherein the one or more processors are configured to increase the score as the degree of difference increases.

10. The device according to claim 1, wherein
the one or more processors are further configured to:
acquire a usefulness determination result by a user with respect to the graph image of each of the plurality of clusters to be displayed;
cause the memory to store therein history information including a set of the specified key phrase and the determination result; and calculate the score based on the history information.

11. The device according to claim 10, wherein the one or more processors are configured to increase the score as a cluster to be calculated is indicated by the history information to be more useful for the specified key phrase.

12. The device according to claim 11, wherein the one or more processors are configured to increase the score as a preset user determines that the cluster to be calculated is more useful for the specified key phrase.

13. The device according to claim 1, wherein the one or more processors are further configured to:
display the graph image of each of the plurality of clusters to be displayed; and
synthesize the graph images of the plurality of clusters to be displayed and display the synthesized images on a dashboard image.

14. An information processing method that is executed by a computer, the information processing method comprising:
clustering a plurality of key phrases extracted from a document group to generate a plurality of clusters each including a plurality of items;
extracting a sub-document group corresponding to a specified key phrase from the document group;
calculating a score for each of the plurality of clusters, the score indicating usefulness of information displayed in a graph image that indicates an amount of information for each of the plurality of items in the sub-document group;
selecting a plurality of clusters to be displayed whose scores are from a highest ranking to a predetermined ranking, among the plurality of clusters; and
generating the graph image of each of the plurality of clusters to be displayed, wherein
the calculating includes calculating the score based on a coverage indicating a ratio of an amount of information of a plurality of documents belonging to a cluster to be calculated to an amount of information of the document group.

15. A computer program product comprising a non-transitory computer-readable medium including programmed instructions stored therein, the instructions causing a computer to execute:
clustering a plurality of key phrases extracted from a document group to generate a plurality of clusters each including a plurality of items;
extracting a sub-document group corresponding to a specified key phrase from the document group;
calculating a score for each of the plurality of clusters, the score indicating usefulness of information displayed in a graph image that indicates an amount of information for each of the plurality of items in the sub-document group;
selecting a plurality of clusters to be displayed whose scores are from a highest ranking to a predetermined ranking, among the plurality of clusters; and
generating the graph image of each of the plurality of clusters to be displayed, wherein
the calculating includes calculating the score based on a coverage indicating a ratio of an amount of information of a plurality of documents belonging to a cluster to be calculated to an amount of information of the document group.

16. An information processing device comprising:
a memory; and
one or more processors coupled to the memory and configured to:
cluster a plurality of key phrases extracted from a document group to generate a plurality of clusters each including a plurality of items;
extract a sub-document group corresponding to a specified key phrase from the document group;
calculate a score for each of the plurality of clusters, the score indicating usefulness of information displayed in a graph image that indicates an amount of information for each of the plurality of items in the sub-document group;
select a plurality of clusters to be displayed whose scores are from a highest ranking to a predetermined ranking, among the plurality of clusters; and
generate the graph image of each of the plurality of clusters to be displayed, wherein
for a first key phrase that is the specified key phrase, the one or more processors are configured to:
extract the sub-document group;
calculate the score for each of the plurality of clusters;
select the plurality of clusters to be displayed; and
generate the graph image of each of the plurality of clusters to be displayed, and
after the graph image of each of the plurality of clusters to be displayed, which are selected for the first key phrase, is displayed, for a second key phrase that is the specified key phrase, the one or more processors are configured to:
extract the sub-document group;
calculate the score for each of the plurality of clusters;
select the plurality of clusters to be displayed; and
generate the graph image of each of the plurality of clusters to be displayed.

17. An information processing device comprising:
a memory; and
one or more processors coupled to the memory and configured to:
  cluster a plurality of key phrases extracted from a document group to generate a plurality of clusters each including a plurality of items;
  extract a sub-document group corresponding to a specified key phrase from the document group;
  calculate a score for each of the plurality of clusters, the score indicating usefulness of information displayed in a graph image that indicates an amount of information for each of the plurality of items in the sub-document group;
  select a plurality of clusters to be displayed whose scores are from a highest ranking to a predetermined ranking, among the plurality of clusters;
  generate the graph image of each of the plurality of clusters to be displayed;
  acquire a usefulness determination result by a user with respect to the graph image of each of the plurality of clusters to be displayed;
  cause the memory to store therein history information including a set of the specified key phrase and the determination result; and
calculate the score based on the history information.

* * * * *